Figure 1:
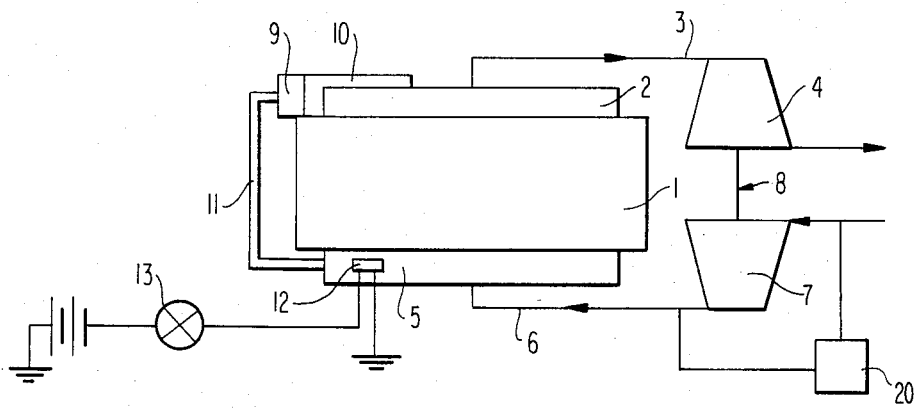

United States Patent [19]

Fortnagel

[11] Patent Number: 4,531,493
[45] Date of Patent: Jul. 30, 1985

[54] INJECTION INTERNAL COMBUSTION ENGINE WITH SUPERCHARGING BY AN EXHAUST GAS TURBOCHARGER

[75] Inventor: Manfred Fortnagel, Korb, Fed. Rep. of Germany

[73] Assignee: Daimler-Benz Aktiengesellschaft, Fed. Rep. of Germany

[21] Appl. No.: 882,060

[22] Filed: Feb. 28, 1978

[30] Foreign Application Priority Data

Mar. 5, 1977 [DE] Fed. Rep. of Germany ....... 2709667

[51] Int. Cl.³ .................... F02B 77/08; F02D 23/02
[52] U.S. Cl. .......................... 123/383; 123/198 DB; 123/198 D
[58] Field of Search ................ 60/598, 600, 601, 602, 60/603, 605; 123/119 C, 198 D, 198 DB, 564, 383

[56] References Cited

U.S. PATENT DOCUMENTS

| 2,383,979 | 9/1945 | Lysholm | 60/601 |
| 4,019,489 | 4/1977 | Cartmill | 123/198 D |
| 4,044,560 | 8/1977 | Dorsch et al. | 60/603 X |

FOREIGN PATENT DOCUMENTS

1277020 6/1972 United Kingdom ........ 123/198 DB

*Primary Examiner*—Michael Koczo
*Attorney, Agent, or Firm*—Craig and Burns

[57] ABSTRACT

An injection internal combustion engine with supercharging by an exhaust gas turbocharger, in which a by-pass control limits the maximum supercharging pressure and in which upon exceeding a predetermined critical maximum pressure a clearly noticeable indication thereof is given to the driver.

2 Claims, 2 Drawing Figures

INJECTION INTERNAL COMBUSTION ENGINE WITH SUPERCHARGING BY AN EXHAUST GAS TURBOCHARGER

The present invention relates to an injection internal combustion engine, especially to an air-compressing injection internal combustion engine, with supercharging by an exhaust gas turbocharger, in which a by-pass control on the side of the turbine or of the supercharger limits the maximum supercharging pressure and in which for increasing the injection quantity from the values of the internal combustion engine with intake suction to the higher values with supercharging, a control member (adjusting installation dependent on supercharging pressure or dependent on absolute pressure) is provided at the injection pump, which is acted upon by the supercharging pressure by means of a connecting line.

With internal combustion engines of the type described hereinabove, an exhaust or bleeder valve is provided for the by-pass control, for example, at the exhaust gas turbocharger on the side of the turbine, which responds upon reaching a predetermined supercharging pressure and prevents an overloading of the internal combustion engine by limiting the supercharging pressure.

It has been found that a failure of this exhaust or bleeder valve cannot be noticed initially by the behavior of the internal combustion engine, for example, during the driving of a motor vehicle equipped with internal combustion engine, and more particularly cannot be noticed for such length of time until the internal combustion engine experiences engine damages as a result of an excessively high supercharging pressure.

The present invention is concerned with the task to render the failure of the exhaust or bleeder valve noticeable for preventing damages in the internal combustion engine. The underlying problems are thereby solved according to the present invention in that a pressure pick-up or pressure transmitter acted upon by the supercharging air is provided which is connected with a signalling installation and causes the signalling installation to produce a warning signal upon exceeding a predetermined critical maximum pressure. The warning can take place acoustically or optically so that the driver of a vehicle equipped with the internal combustion engine will forcibly have his attention directed to the fact that during a further operation of the internal combustion engine, drive unit damages can be expected.

A further solution of the underlying problems resides in that a pressure pick-up or transmitter acted upon by the supercharging air closes a valve arranged in the connecting line to the control member at the injection pump upon exceeding a predetermined critical maximum pressure and in case of an adjusting installation dependent on supercharging pressure opens the section of the connecting line disposed between the valve and the control member to the atmosphere or in case of an adjusting installation dependent on absolute pressure connects the same also to the atmosphere or for purposes of a further line reduction with a vacuum source.

It is advantageously achieved by this measure that the injection quantity is reduced at the injection pump by way of the adjusting installation which is vented or connected to a vacuum source. A noticeable power decrease results therefrom which will be felt. The internal combustion engine remains operable with a reduced power output so that a repair or service shop can be looked for while continuing to drive the vehicle. Power plant or drive unit damages are not to be expected under those circumstances.

Accordingly, it is an object of the present invention to provide an injection internal combustion engine with supercharging by an exhaust gas turbocharger which avoids by simple means the aforementioned shortcomings and drawbacks encountered in the prior art.

Another object of the present invention resides in an injection internal combustion engine with supercharging by an exhaust gas turbocharger, especially an air-compressing injection internal combustion engine with supercharging by an exhaust gas turbocharger, in which a damage to the engine as a result of excessive supercharging pressures is effectively and reliably precluded by simple structural means.

A further object of the present invention resides in an injection internal combustion engine with supercharging by an exhaust gas turbocharger in which a failure of the bleeder valve will be clearly and noticeably signalled to the driver.

Still a further object of the present invention resides in a control system for an injection internal combustion engine with supercharging by an exhaust gas turbocharger which reduces the output of the engine in case of failure of the bleeder valve so as to permit a continued driving only with reduced power output.

Figure 2:
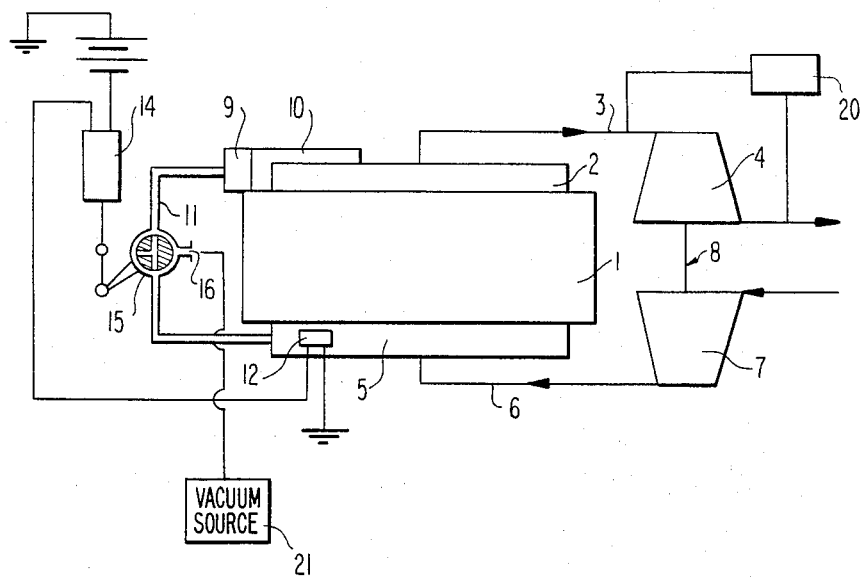

These and other objects, features and advantages of the present invention will become more apparent from the following description when taken in connection with the accompanying drawing which shows, for purposes of illustration only, two embodiments in accordance with the present invention, and wherein:

FIG. 1 is a schematic view of an injection internal combustion engine with supercharging by an exhaust gas turbocharger and equipped with a control system in accordance with the present invention; and FIG. 2 is a schematic view of a modified embodiment of an injection internal combustion engine with supercharging by an exhaust gas turbocharger and equipped with a modified control system in accordance with the present invention.

Referring now to the drawing wherein like reference numerals are used throughout the two views to designate like parts, and more particularly to FIG. 1, an injection internal combustion engine 1 for driving a motor vehicle according to a first embodiment is illustrated in this figure which is connected with its exhaust gas line 3 coming from the exhaust gas manifold 2 to a turbine 4 and with its inlet line 6 leading to the inlet manifold 5 to a compressor 7 of an exhaust gas turbocharger 8. The exhaust gas turbocharger 8 is equipped at the compressor 7 or at the turbine 4 with a by-pass control valve 20 of conventional construction for the limitation of the maximum supercharging pressure. An injection quantity adjusting mechanism is arranged in the governor 9 of the injection pump 10, which is dependent on supercharging pressure or on absolute pressure and which is connected with the inlet manifold 5 by way of a line 11.

In order that, in case of failure of the by-pass control valve 20 provided in the exhaust gas turbocharger 8 for the by-pass control to limit the maximum supercharging pressure, a forcible warning takes place to the effect that the supercharging pressure has increased non-permissively high and drive unit damages must be expected if the vehicle continues to be driven. For this purpose, a pressure pick-off or transmitter 12 of any conventional construction is arranged at the inlet manifold 5 which is acted upon by the supercharging air and which upon exceeding the adjusted pressure connects a warning light 13 with a power supply.

In the case of the second embodiment according to FIG. 2, in which the reference numerals 1 to 12 designate the same parts as in the embodiment according to FIG. 1, the pressure pick-off or transmitter 12 at the inlet manifold 5 is connected with an electromagnet 14, by means of which a valve 15 arranged in the line 11 is controlled.

During normal operation of the internal combustion engine 1, the valve 15 assumes a position—as shown in FIG. 2—in which it keeps the line 11 open. The supercharging pressure prevailing in the inlet manifold 5 can then influence the governor 9 of the injection pump 10 in the desired manner. If, in contrast thereto, a failure of the by-pass control valve 20 in the exhaust gas turbocharger 8 occurs and if the supercharging pressure assumes a nonpermissively high value, then the pressure pick-off or transmitter 12 responds and the valve 15 is so adjusted or displaced by way of the electromagnet 14 that the part of the line 11 coming from the inlet manifold 5 to the valve 15 is interrupted and the part of the line 11 leading from the valve 15 to the governor 9 at the injection pump 10 is connected by way of the connecting piece 16 with the atmosphere or with a vacuum source 21. In both cases, the quantity of the fuel to be injected is thereby so far reduced by way of the quantity adjustment mechanism dependent on supercharging pressure or absolute pressure in the governor 9 of the injection pump 10 that the occurring power decrease of the internal combustion engine can be clearly noticed by the driver, yet it is possible to continue driving the vehicle to a repair shop without danger of damage to the drive unit of the internal combustion engine.

While I have shown and described two embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A fuel-injected internal combustion engine comprising a fuel-injection pump operatively connected to the engine, supercharging means operatively connected to an intake manifold means and exhaust manifold means of the engine, said supercharging means including an exhaust gas turbine means and a compressor means adapted to be driven by said turbine means, a by-pass control means provided at least one of the turbine means and compressor means for limiting a maximum supercharging pressure of the supercharging means, means for adjusting injection quantities of fuel for operation of the internal combustion engine with and without supercharging, the adjusting means including a control member provided at the fuel injection pump which is adapted to be acted upon by the supercharging pressure, and connecting line means arranged between the intake manifold means and the control member for enabling the supercharging pressure to act upon the control member, characterized in that a pressure-responsive means is operatively connected to the supercharging means for providing a noticeable indication to an operator of the engine that a predetermined maximum critical pressure has been exceeded in the intake manifold means of the engine, said pressure-responsive means includes a pressure transmitter means acted upon by the supercharging air, a valve means is arranged in the connecting line means for controlling the amount of supercharging pressure acting upon the control member, means are provided for connecting a section of the connecting line means disposed between the valve means and the control member with a pressure considerably lower than a pressure prevailing in the intake manifold means so as to reduce the power output of the engine, and in that the pressure responsive means is operable to close the valve means upon the supercharging pressure exceeding a predetermined critical maximum pressure.

2. A fuel-injected internal combustion engine according to claim 1, characterized in that means are provided for venting the section of the connecting line means disposed between the valve means and control member with the atmosphere when said valve means is closed.

* * * * *